United States Patent
Tyvoll

(10) Patent No.: US 7,220,303 B2
(45) Date of Patent: May 22, 2007

(54) PIGMENTED INKS HAVING DIFFERENT PARTICLE SIZES AND/OR MORPHOLOGIES AND DISTINCT CHEMICAL DISPERSIONS

(75) Inventor: David Tyvoll, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 10/823,015

(22) Filed: Apr. 13, 2004

(65) Prior Publication Data

US 2005/0223938 A1 Oct. 13, 2005

(51) Int. Cl.
*C09D 11/02* (2006.01)

(52) U.S. Cl. .................... 106/31.6; 106/31.65

(58) Field of Classification Search ............... 106/31.6, 106/31.65
See application file for complete search history.

(56) References Cited

U.S. PATENT DOCUMENTS

| | | | |
|---|---|---|---|
| 6,143,807 A * | 11/2000 | Lin et al. ................. | 523/161 |
| 6,387,168 B1 * | 5/2002 | Koitabashi et al. ........ | 106/31.6 |
| 6,440,203 B2 * | 8/2002 | Kato .......................... | 106/31.6 |
| 6,503,317 B1 | 1/2003 | Ortalano et al. | |
| 6,514,328 B1 | 2/2003 | Katoh et al. | |
| 6,534,128 B1 | 3/2003 | Carlson et al. | |
| 6,537,358 B1 * | 3/2003 | Horiuchi et al. ........... | 106/31.6 |
| 6,540,344 B2 * | 4/2003 | Kashiwazaki et al. ...... | 347/100 |
| 2004/0020406 A1 | 2/2004 | Kato | |

FOREIGN PATENT DOCUMENTS

EP   1 357 157 A1   10/2003

* cited by examiner

*Primary Examiner*—J. A. Lorengo
*Assistant Examiner*—Veronica Faison-Gee

(57) ABSTRACT

An inkjet ink that provides improved print quality on diverse types of print media. The inkjet ink includes a first pigment dispersion and a second pigment dispersion in which the pigments are formulated to segregate when deposited on a glossy print medium. Each of the pigments in the first and second pigment dispersions may have at least one of a different particle size, a different particle morphology, and a different manner of dispersion. An inkjet ink that provides improved print quality on a print medium having chemically and physically distinct domains is also disclosed.

17 Claims, No Drawings

PIGMENTED INKS HAVING DIFFERENT PARTICLE SIZES AND/OR MORPHOLOGIES AND DISTINCT CHEMICAL DISPERSIONS

FIELD OF THE INVENTION

The present invention relates to a pigment-based inkjet ink and, more specifically, to a pigment-based inkjet ink having improved print quality on diverse types of print media or on a print medium having chemically and physically distinct domains.

BACKGROUND OF THE INVENTION

Colorants that are typically used in inkjet inks include dyes or pigments. While dyes are more commonly used in inkjet inks, images printed with dye-based inkjet inks are generally less waterfast, lightfast, and resistant to ozone than images printed with pigment-based inkjet inks. However, the pigments are typically insoluble in an ink vehicle of the inkjet ink and form discrete particles that clump or agglomerate if they are not stabilized in the inkjet ink. To prevent the pigments from agglomerating or settling out of the ink vehicle, the pigments are uniformly dispersed in the inkjet ink and stabilized in the dispersed form until the inkjet ink is used for printing. The pigment is typically present in the inkjet ink in a distribution of particle sizes, which is selected based on performance attributes, such as stability, gloss, optical density ("OD"), and the like.

Polymeric dispersants are used to disperse particles of the pigment in the ink vehicle through non-covalent interactions. The polymeric dispersant binds to a surface of the pigment, providing stability to the pigment dispersion. Alternatively, the pigment particles are modified by covalently attaching solubilizing moieties, such as polymeric, ionic, or organic groups, to the surface of the pigment. The surface-modified pigments or self-dispersed pigments expand the potential range of chemical and physical diversity of the pigment.

An inkjet ink having a first pigment, a second pigment, and benzylmethacrylate as a polymer dispersant has been disclosed. The inkjet ink forms an ink dot having a uniform and high density and proper dot size. The first pigment is a self-dispersed pigment that has anionic groups bonded to its surface while the second pigment is dispersed by the polymer dispersant.

An inkjet ink having good color development has also been disclosed. The inkjet ink includes a first colorant and a second colorant. The first colorant is a first pigment that has carboxyl, carbonyl, hydroxyl, or sulfone groups attached to its surface and is dispersible or dissolvable in water without a dispersant. The second colorant is a pigment that requires a dispersant, such as a polymeric dispersant or surfactant, in the ink vehicle.

Inkjet inks are printed on a wide variety of print media, such as plain paper print media ("plain paper") or specialty print media. Specialty print media include glossy print media, such as porous print media or swellable print media, and transparencies. Each type of print media is optimized for different end uses and has diverse chemical and physical properties. Therefore, dispersion chemistry and particle size of the pigment-based inkjet ink are optimized to achieve acceptable print quality across the different types of print media. However, in order to achieve the acceptable print quality across the different print media, compromises in performance attributes are made on each type of print media. As such, while the inkjet ink provides acceptable print quality across the different print media, the inkjet ink does not provide optimal print quality on each of the print media. In addition, it is difficult to use a particle size distribution of pigments having optimal performance attributes across these diverse print media types.

For instance, to enhance OD of the printed image on plain paper, a pigment used in a black, pigmented inkjet ink would typically have a high structure, a fast rate of agglomeration, and a large aggregate particle size. As used herein, the term "high structure" refers to a pigment having a dibutylphthalate absorption number ("DBP number") greater than approximately 100 ml/100 g, per ISO 4656 or similar test methods. In contrast, "low structure" refers to a pigment having a DBP number ranging from approximately 40 ml/100 g to approximately 70 ml/100 g. However, if the black, pigmented inkjet ink described above was printed on a glossy print medium, the printed image would have poor gloss, a high surface roughness, and reduced durability.

Chemical and physical diversity is also encountered within a particular type of print medium. For instance, distinct chemical and physical domains are present in low-cost, plain papers, especially in plain papers having a high content of recycled materials. The domains range in size from approximately one micron to approximately several hundred microns and include domains of cellulose, sizing agents, or inorganic pigments, such as calcium carbonate. Current drop volumes of thermal and piezo inkjet printers yield dot sizes on the same scale as these domains. Therefore, when the inkjet ink is applied to the print medium, the inkjet ink is exposed to different environments depending on the domains that it encounters. Since each of the domains have different chemical and physical properties compared to other portions of the print medium, the inkjet ink interacts differently with the domains.

Pigments are also widely used in the paint industry. To produce a desired paint color, multiple pigment dispersions are typically combined. However, when more than one pigment dispersion is used, the pigments may separate from each other, which is an undesirable phenomenon known as floating or flooding. Floating refers to an uneven distribution of the pigments after the paint is applied and results in a mottled, blotchy, or streaked color variation in the applied paint film. Floating is caused by using different particle size pigments in the paint, using more than one type of pigment, different pigment flocculation rates, or gradients in surface tension, density, or temperature. Flooding produces a uniform color of the paint film but variations in color occur throughout the coating thickness caused by different rates of pigment settling in the paint film. The pigment settling rates are due to differences in pigment size, density, shape, or degree of flocculation. To prevent floating or flooding, anti-floating and anti-flooding additives are added to the paint.

BRIEF SUMMARY OF THE INVENTION

The present invention relates to an inkjet ink having improved print quality across different types of print media. The inkjet ink includes a first pigment dispersion and a second pigment dispersion, wherein pigments in the first pigment dispersion and in the second pigment dispersion are formulated to segregate when deposited on a glossy print medium. The inkjet ink also includes an ink vehicle.

The present invention also relates to a method of providing improved print quality across different types of print media. The method includes applying an inkjet ink that has a first pigment dispersion and a second pigment dispersion to a print medium, wherein pigments in the first pigment dispersion and in the second pigment dispersion are formulated to segregate when deposited on a glossy print medium.

The present invention also relates to an inkjet ink having improved print quality on a plain paper with multiple domains. The inkjet ink includes a first pigment dispersion and a second pigment dispersion, wherein the first pigment dispersion is formulated to interact with a first domain of the plain paper and the second pigment dispersion is formulated to interact with a second domain of the plain paper. The inkjet ink also includes an ink vehicle.

The present invention also relates to a method of providing improved print quality on a plain paper with multiple domains. The method includes applying an inkjet ink that has a first pigment dispersion and a second pigment dispersion to a print medium, wherein the first pigment dispersion is formulated to interact with a first domain of the plain paper and the second pigment dispersion is formulated to interact with a second domain of the plain paper.

DETAILED DESCRIPTION OF THE INVENTION

An inkjet ink is provided in which improved or enhanced print quality across and within diverse types of print media is achieved, such as across and within plain papers and glossy print media. An inkjet ink having enhanced print quality within a print medium that has multiple chemically and physically distinct domains is also disclosed. As used herein, the term "print quality" refers to at least one of gloss, durability, and OD of the printed image. The inkjet ink may also have a shorter drytime, decreased feathering, and decreased wicking.

The inkjet ink includes at least two different or dissimilar pigment dispersions. As used herein, the term "different pigment dispersion" refers to a pigment dispersion in which a particular pigment is dispersed in a different or dissimilar manner in each of the pigment dispersions, a pigment dispersion in which a different or dissimilar type of pigment is dispersed in the same manner in each of the pigment dispersions, or a pigment dispersion in which a different or dissimilar type of pigment is dispersed in dissimilar manners in each of the pigment dispersions. In other words, the pigment dispersions may have different colloidal stabilities.

In one embodiment, the pigments used in each of the pigment dispersions may differentially segregate or flood when the inkjet ink is applied to the glossy print medium, providing enhanced print quality on the glossy print medium. When the inkjet ink is applied to the plain paper, good print quality may also be achieved. While the inkjet ink is described herein as including two pigment dispersions, the inkjet ink may also include more than two pigment dispersions.

The pigment in each of the pigment dispersions is a self-dispersed pigment or a polymer-attached pigment. As used herein, the term "self-dispersed pigment" refers to a pigment having at least one ionic or low molecular weight organic group covalently attached to the surface of the pigment, which disperses the first pigment in the inkjet ink. Self-dispersed pigments are known in the art and may have carboxyl, carbonyl, hydroxyl, or sulfone groups covalently attached to the surface of the pigment.

As used herein, the term "polymer-attached pigment" refers to a pigment having polymeric groups covalently attached to the pigment surface, which disperse the second pigment in the inkjet ink. Polymer-attached pigments are known in the art and may include, but are not limited to, polycarboxylates, polyvinyl alcohols (PVA), or polyalkyleneoxides, such as polyethyleneoxide (PEO), polyamides, or polyethyleneimines (PEI), covalently attached to the surface of the pigment. The polymer attached to the pigment surface may also be a polyester, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl napthalene-acrylic acid copolymers, vinyl napthalene-maleic acid copolymers and salts thereof. Additional polymers include polyvinylimidazole, derivatives of polyvinyl-imidazole, copolymers of vinylimidazole, copolymers of vinylimidazole derivatives, polyvinylpyridine, derivatives of polyvinylpyridine, copolymers of vinylpyridine, copolymers of vinylpyridine derivatives, derivatives of polyethyleneimine, and mixtures thereof. Examples of the polymers include the Joncryl® resins available from Johnson Polymer (Sturtevant, Wis.), and the Jeffamine® resins available from Huntsman Petrochemical Corporation (Houston, Tex.). As such, the first and second pigments may be dispersed in the inkjet ink without additional unbound polymeric dispersants. For the sake of example only, a first pigment in a first pigment dispersion may be a self-dispersed pigment and a second pigment in a second pigment dispersion may be a polymer-attached pigment.

The first pigment dispersion and the second pigment dispersion may be present in the inkjet ink at a ratio ranging from approximately 1:1 to approximately 9:1. In one embodiment, the first pigment dispersion and the second pigment dispersion are present at a ratio of 4:1.

To provide improved print quality across diverse types of print media, each of the pigment dispersions in the inkjet ink may be formulated to provide improved print quality on at least one type of print medium. For the sake of example only, the first pigment dispersion may be formulated to optimize performance attributes on a plain paper and the second pigment dispersion may be formulated to optimize performance attributes on a glossy print medium. Examples of plain papers include, but are not limited to, Gilbert Bond, Georgia-Pacific Multi-System®, Aussedat-Rey-Reymat, Champion DataCopy, Enso-Gutzeit Berga Laser, Hammermill® Fore DP, Honshu New Yamayuri, Hokuestsu kin-Mari, KymCopy Lux, MoDo DataCopy, Neenah Classic Laid, Oji Sunace PPC, Stora Papyrus MultiCopy, Union Camp Great White®, Weyerhauser First Choice®, and Wiggens Teape Conqueror®. The glossy print medium may be a porous print medium or a swellable print medium, such as an inkjet photopaper. Examples of glossy print media include, but are not limited to, HP premium glossy paper, Epson photo paper, Pictorico premium photo glossy, Agfa glossy photo inkjet paper, Konica photo inkjet paper, Canon glossy photo paper, Hammermill® Jetprint Ultra Gloss, Polaroid inkjet paper, and Kodak inkjet photo quality-photo weight paper.

When the inkjet ink of the present invention is printed on both plain paper and glossy print media, the print quality of the images may, on average, be improved relative to the print quality of images printed with an inkjet ink having one pigment dispersion. As such, the two pigment dispersions may provide greater flexibility to the inkjet ink, enabling the inkjet ink to produce improved print quality across diverse print media types.

The pigment used in each of the pigment dispersions may be a conventional pigment, such as a carbon black, an organic pigment, a white inorganic pigment, a colored inorganic pigment, or mixtures thereof. The pigment may be a black pigment or a colored pigment, such as a blue, black, brown, cyan, green, white, violet, magenta, red, or yellow pigment. In addition, mixtures of colored pigments may be used in the inkjet ink, as well as mixtures of black and colored pigments. The inorganic pigment may include, but is not limited to, iron oxides, titanium oxides, zinc oxide, zinc sulphides, zinc chromate, zirconium oxide, iron blue, ultramarine blue, chromium oxide, ultramarine, cobalt blue, cobalt violet, silicon dioxide, nickel oxides, aluminium oxides, ferric ferrocyanide (Prussian blue), lead chromate, white lead, basic lead sulfate, cadmium yellow, chrome yellow, barium sulfate, calcium carbonate, calcium silicate, and manganese violet.

The pigment may be a carbon black pigment, such as a channel black, a furnace black, or a lamp black. Examples of carbon blacks include those sold under the Regal®, Black Pearls®, Elftex®, Monarch®, Mogul®, and Vulcan® trademarks, which are available from Cabot Corporation (Boston, Mass.). The carbon black may include, but is not limited to, Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P. Other carbon blacks include, but are not limited to, Printex 40, Printex 80, Printex 300, Printex L, Printex U, Printex V, Special Black 4, Special Black 5, FW1, FW2, FW18, and FW200, which are available from Degussa Corporation (Ridgefield, N.J.); Raven 780, Raven 890, Raven 1020, Raven 1040, Raven 1255, Raven 1500, Raven 5000, Raven 5250, which are available from Colombian Chemical Corporation (Atlanta, Ga.); and MA100 and MA440, which are available from Mitsubishi Chemical Corporation (Tokyo, Japan).

Suitable classes of colored pigments include, but are not limited to, anthraquinones, phthalocyanine blues, phthalocyanine greens, diazos, monoazos, pyranthrones, perylenes, heterocyclic yellows, quinacridones, and (thio)indigoids. Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyranthrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 93, Pigment Yellow 151, Pigment Yellow 154, Pigment Yellow 155, Pigment Yellow 117, Pigment Yellow 128, Pigment Yellow 138, Pigment Yellow 109, Pigment Yellow 110, and Pigment Yellow 213. These pigments are commercially available in either powder or press cake form from a number of sources including, BASF Corp. (Mount Olive, N.J.), Engelhard Corp. (Iselin, N.J.), CIBA Corp. (Tarrytown, N.Y.), Clariant Corp. (Coventry, R.I.), or Sun Chemical Corp. (Cincinnati, Ohio).

The pigment may also include the Hostafine® series of pigments, such as Hostafine® Yellow GR, Hostafine® Yellow, Hostafine® Red FRLL, Hostafine® Rubine F6B, Hostafine® Blue 2G, Hostafine® Black T and Hostafine® Black TS, which are available from Clariant GmbH (Muttenz, Switzerland); Normandy Magenta RD-2400 (Paul Uhlich), Paliogen Violet 5100 (BASF Corp.), Paliogen® Violet 5890 (BASF Corp.), Permanent Violet VT2645 (Paul Uhlich), Heliogen Green L8730 (BASF Corp.), Argyle Green XP-111-S (Paul Uhlich), Brilliant Green Toner GR 0991 (Paul Uhlich), Heliogen® Blue L6900, L7020 (BASF Corp.), Heliogen® Blue D6840, D7080 (BASF Corp.), Sudan Blue OS (BASF Corp.), PV Fast Blue B2GO1 (American Clariant), Irgalite Blue BCA (Ciba), Paliogen® Blue 6470 (BASF Corp.), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF Corp.), Paliogen® Orange 3040 (BASF Corp.), Ortho Orange OR 2673 (Paul Uhlich), Paliogen® Yellow 152, 1560 (BASF Corp.), Lithol Fast Yellow 0991K (BASF Corp.), Paliotol Yellow 1840 (BASF Corp.), Novoperm® Red BN (Clariant), Novoperm® Yellow FG 1 (Clariant), Permanent Yellow YE 0305 (Paul Uhlich), Lumogen Yellow D0790 (BASF Corp.), Suco-Gelb L1250 (BASF Corp.), Suco-Yellow D1355 (BASF Corp.), Hostaperm® Pink E (American Clariant), Fanal Pink D4830 (BASF Corp.), Cinquasia Magenta (DuPont), Lithol Scarlet D3700 (BASF Corp.), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF Corp.), Bon Red C (Dominion Color Company), Royal Brilliant Red RD-8192 (Paul Uhlich), Oracet Pink RF (Ciba), Paliogen® Red 3871 K (BASF Corp.), Paliogen® Red 3340 (BASF), and Lithol Fast Scarlet L4300 (BASF Corp.).

As previously mentioned, each of the pigment dispersions in the inkjet ink may be different or dissimilar so that the pigments may differentially segregate or flood when the inkjet ink is applied to the glossy print medium. By using dissimilar pigment dispersions, diffusion characteristics or properties of each of the pigment dispersions, such as their respective diffusion rates, mobilities, or aggregation rates, may differ. For instance, a pigment with a smaller diameter may be more mobile than a pigment with a larger diameter. Also, a pigment with high structure may diffuse more slowly than particles composed of an equivalent mass of carbon black per particle but having a low structure. These properties affect the pigments' flocculation and rate of flocculation and, therefore, the pigment dispersions may differentially segregate when applied to the glossy print medium.

The pigments in the first and second pigment dispersions may be dispersed in different or dissimilar manners, such as by using a self-dispersed pigment as the first pigment and a polymer-attached pigment as the second pigment. Alternatively, the pigment in the first pigment dispersion may be dispersed with polyacrylates so that the pigment flocculates rapidly on the print medium upon neutralization. The pigment in the second pigment dispersion may be dispersed with sulfonates, which are not neutralized at the pH range of the print medium. Therefore, the pigment dispersed with the sulfonates may flocculate more slowly. In addition, dissimilar types of pigments may be dispersed in the same manner in each of the pigment dispersions. For the sake of example only, the pigment in the first pigment dispersion may be carbon black and the pigment in the second pigment dispersion may be an inorganic pigment.

The pigments used in the first and second pigment dispersions may also be the same type of pigment but may differ in at least one of their particle size, particle size distribution, or morphology. The pigments may also differ in their color. However, differently-colored pigments may create hue gradients on the print media, which are difficult to control. The pigments in each of the pigment dispersions may have a particle size ranging from approximately 1 nm to approximately 300 nm. In addition, a ratio of the particle sizes in each of the pigment dispersions may be greater than approximately 3:1. In other words, the pigment in the first pigment dispersion may have a particle size that is at least 3 times greater than the particle size of the pigment in the second pigment dispersion. For the sake of example only, the first pigment may be carbon black and have a particle size of 150 nm while the second pigment may be carbon black and have a particle size of 30 nm.

The diffusion characteristics of the pigment dispersions may also be affected by using different morphologies of the pigments. For instance, pigments having a spherical morphology are more colloidally stable than pigments having large aspect ratios, such as pigments having needle-like crystals. As such, the pigments having the spherical morphology may stay in solution in the inkjet ink longer, rather than rapidly precipitating on the print medium. In addition, dissimilar crystal forms of the pigments, such as an $\alpha$, $\beta$, or $\gamma$ crystal form of the pigment phthalocyanine, may be used in each of the pigment dispersions. The different crystal forms may have different particle densities, which in turn affect the colloidal stability of the pigment dispersion. In general, a crystal form that has a greater density is less colloidally stable than a crystal form having a lower density.

In addition to providing improved print quality across diverse print media types, the multiple pigment dispersions may modify the rheological properties of the inkjet ink. For instance, the inkjet ink of the present invention may have a reduced viscosity compared to the viscosity of an inkjet ink that includes one pigment dispersion. The reduced viscosity may enable the inkjet ink of the present invention to be ejected from the inkjet pen at higher frequencies. The reduced viscosity may also improve reliability of the inkjet pen. The inkjet ink may also have a short drytime compared to conventional inkjet inks.

If a black inkjet ink having one pigment dispersion was to be formulated for use on a plain paper, a carbon black having high structure and a large aggregate particle size would be selected to enhance the OD of the printed image. However, if this black inkjet ink were to be printed on a glossy print medium, the printed image would have poor gloss, increased surface roughness, and decreased durability due to rapid precipitation of the carbon black on the surface of the glossy print medium. If the black inkjet ink was formulated to include a second pigment dispersion having a smaller particle size and lower structure than the first pigment dispersion, as in the inkjet ink of the present invention, the second pigment dispersion would flocculate slower than the first pigment dispersion, enhancing the leveling of the film during drying. As such, the inkjet ink of the present invention would provide improved print quality on both the plain paper and the glossy print medium.

In one embodiment of the present invention, the pigment in the first pigment dispersion of the inkjet ink is a carbon black having a high structure and a large particle size, such as a particle size of approximately 150 nm. For the sake of example only, Monarch 700 (available from Cabot) or FW18 (available from Degussa) may be used as the pigment. The first pigment may be a polymer-attached pigment or a self-dispersed pigment. If the first pigment is a polymer-attached pigment, it may have a styrene acrylate attached to the pigment. The styrene acrylate may have an acid number of 210 and a molecular weight of 12,500, such as Joncryl® 67, which is available from Johnson Polymers. The second pigment is also a carbon black but has low structure and a small particle size, such as approximately 40 nm. For the sake of example only, the pigment may be Black Pearls® 1100. The second pigment may be a self-dispersed pigment, such as a sulfonated carbon black, or may be a polymer-attached pigment.

When this inkjet ink is applied to the plain paper, good print quality is achieved. When this inkjet ink is applied to the glossy print medium, the first pigment and the second pigment may differentially segregate or separate. Since the second pigment is smaller and more colloidally stable than the first pigment, the second pigment may flocculate more slowly than the first pigment. As a consequence, the first pigment and the second pigment may be unevenly distributed in the resulting film on the print medium due to the phenomenon of flooding. Without being tied to a particular theory, it is believed that the flooding of the second pigment enhances the print quality on the glossy print medium. It is believed that the second pigment enhances the leveling and produces a more uniform film on the glossy print medium.

As such, the performance of this inkjet ink on the plain paper may be similar to that of an inkjet ink including only the first pigment dispersion. By keeping the first pigment near the surface of the plain paper, the OD of the printed image may be improved and feathering may be decreased. However, when this inkjet ink is deposited on the glossy print medium, the gloss of the printed image is greatly enhanced compared to the gloss of an image printed with an inkjet ink including only the first pigment dispersion. As such, the inkjet ink of the present invention may provide a printed image that has enhanced print quality across and within diverse types of print media, such as across and within plain papers and glossy print media.

The inkjet ink may also provide improved durability compared to an inkjet ink including only the first pigment dispersion. The second pigment dispersion, which has slower flocculation, as described above, may be further modified with hydrophobic or poorly-wetting moieties, such as fluorinated compounds or silicone-based materials. During leveling, the second pigment may differentially segregate to form a film, increasing the amount of poorly-wetting materials on the surface of the film. This may increase the durability of the printed image by improving its resistance to water and applied friction.

In another embodiment, an inkjet ink is provided having enhanced print quality within a print medium that has multiple chemically and physically distinct domains. The inkjet ink may be formulated to provide improved print quality on a single print medium that has multiple domains, such as a plain paper. In this embodiment, the first pigment dispersion may be formulated to optimize performance attributes on a first domain of the plain paper and a second pigment dispersion may be formulated to optimize performance attributes on a second domain of the plain paper. The domains in the plain paper may include, but are not limited to, cellulose domains, domains of sizing agents, or domains of inorganic pigments, such as domains of calcium carbonate.

The pigments in each of the first and second pigment dispersions may be conventional pigments, such as a carbon black, an organic pigment, a white inorganic pigment, a colored inorganic pigment, or mixtures thereof, as described above. For instance, the pigments in both pigment dispersions may have at least one of a large particle size and a high structure, such as Monarch 700 (Cabot) or FW18 (Degussa). The first pigment dispersion and the second pigment dispersion may be present in the inkjet ink at a ratio ranging from approximately 1:4 to approximately 4:1. In one embodiment, the first pigment dispersion and the second pigment dispersion are present at a ratio of 1:1.

Each of the pigment dispersions may be formulated to interact with a different domain on the plain paper by dispersing each of the pigments in a dissimilar manner. For the sake of example only, the first pigment dispersion may be formulated to interact with cellulose domains on the plain paper and the second pigment dispersion may be formulated to interact with calcium carbonate domains. To enhance interactions with the cellulose domains, the pigment in the first pigment dispersion may be modified with saccharides, amides, and polymers thereof. The first pigment dispersion may alternatively include anionically modified polyamines, such as PEI or pentaethylenehexamine (PEHA), where the anionic modifications are derived from acylating agents, such as acetic, succinic, and aryl succinic anhydrides. To interact with the calcium carbonate domains, a polyacrylate may be attached to the pigment in the second pigment dispersion. Styrene acrylics, such as those available from Johnson Polymer, may be attached to the pigment in the second pigment dispersion. In one embodiment, the pigments dispersed in each of the first and second pigment dispersions may be polymer-attached pigments.

To provide the improved print quality on the different domains, the different pigment dispersions, as described previously, may be used. For the sake of example only, the pigment in the first pigment dispersion may have a dispersant that enables the first pigment dispersion to interact with the cellulose domains on the print medium while the pigment in the second pigment dispersion may have a dispersant that enables it to interact with the calcium carbonate domains in the print medium.

In one embodiment, the first pigment is a carbon black having a high structure and a large particle size. For instance, the first pigment may be Monarch 700 (Cabot) or FW18 (Degussa), which have particle sizes of approximately 150 nm. The first pigment may be a polymer-attached pigment. To disperse the first pigment, the first pigment dispersion may utilize anionically-modified PEI, which is covalently attached to the first pigment. The second pigment may also be a carbon black with a high structure and a large particle size, such as Monarch 700 (Cabot) or FW18 (Degussa, and may be a polymer-attached pigment. The second pigment dispersion may utilize Joncryl® 67, which is covalently attached to the second pigment, to disperse the second pigment. As such, each of the pigment dispersions is dispersed in a dissimilar manner.

When the inkjet ink is applied to the plain paper, the first pigment may interact with the domain with which it has affinity. Similarly, the second pigment may interact with the domain for which it has affinity. In this way, the overall flocculation rate of the first and second pigments in the inkjet ink may be increased. As such, the first and second pigments may remain on the surface of the plain paper, improving the OD of the printed image. In contrast, if an inkjet ink having one pigment dispersion, such as the first pigment dispersion, is applied to the print medium, the print quality may be reduced.

In addition to the pigment dispersions, the inkjet ink may include an ink vehicle formed from water and at least one water-soluble organic solvent. Organic solvents suitable for use in the inkjet ink are known in the art and, as such, are not discussed in detail herein. An amount of pigment present in the inkjet ink, which includes the amount of the first pigment and of the second pigment, may range from approximately 0.1% by weight ("wt %") to approximately 15 wt %. The inkjet ink may also include optional components, such as at least one of the following: surfactants, humectants, buffers, biocides, wetting agents, preservatives, solubilizers, antioxidants, corrosion inhibitors, or ultraviolet absorbers. These components, if present, may be selected for use in the inkjet ink of the present invention by one of ordinary skill in the art and, as such, are not discussed in detail herein.

To form the inkjet ink of the present invention, each of the pigment dispersions may be produced separately. The pigment dispersions may then be combined to form the inkjet ink. When combined, the pigment dispersions may maintain their respective properties, such as their different dispersion characteristics. Each of the pigment dispersions may be purified before combination or the inkjet ink may be purified after the pigment dispersions are combined.

While the invention may be susceptible to various modifications and alternative forms, specific embodiments have been shown by way of example and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An inkjet ink having improved print quality across different types of print media, comprising:
a first pigment dispersion and a second pigment dispersion, wherein pigments in the first pigment dispersion and in the second pigment dispersion are formulated to segregate when deposited on a glossy print medium, and wherein the pigment in the first pigment dispersion is dispersed with a polyacrylate and the pigment in the second pigment dispersion is dispersed with a sulfonate; and
an ink vehicle.

2. The inkjet ink of claim 1, wherein each of the pigments in the first pigment dispersion and in the second pigment dispersion has at least one of a dissimilar particle size, a dissimilar particle morphology, and a dissimilar manner of dispersion.

3. The inkjet ink of claim 1, wherein each of the pigments in the first pigment dispersion and in the second pigment dispersion is selected from the group consisting of carbon black, an organic pigment, a white inorganic pigment, a colored inorganic pigment, and mixtures thereof.

4. The inkjet ink of claim 1, wherein each of the pigments in the first pigment dispersion and in the second pigment dispersion is selected from the group consisting of self-dispersed pigments and polymer-attached pigments.

5. The inkjet ink of claim 1, wherein the pigment in the first pigment dispersion and the pigment in the second pigment dispersion have a particle size ranging from approximately 1 nm to approximately 300 nm and wherein a ratio of a particle size of the pigment in the first pigment dispersion to the particle size of the pigment in the second pigment dispersion is greater than approximately 3:1.

6. The inkjet ink of claim 1, wherein the first pigment is carbon black and has a particle size of 150 nm and the second pigment is carbon black and has a particle size of 30 nm.

7. The inkjet ink of claim 1, wherein the pigment in the first pigment dispersion has a high structure and the pigment in the second pigment dispersion has a low structure.

8. The inkjet ink of claim 1, wherein the first pigment dispersion and the second pigment dispersion are present at a ratio ranging from approximately 1:1 to approximately 9:1.

9. An inkjet ink having improved print quality on a plain paper with multiple domains, comprising:
   a first pigment dispersion and a second pigment dispersion, wherein the first pigment dispersion is formulated to interact with a first domain of the plain paper and the second pigment dispersion is formulated to interact with a second domain of the plain paper, wherein each of the first pigment dispersion and the second pigment dispersion are formulated to interact with a domain selected from the group consisting of cellulose domains, domains of sizing agents, and domains of calcium carbonate; and
   an ink vehicle.

10. The inkjet ink of claim 9, wherein each of the pigments in the first pigment dispersion and in the second pigment dispersion are dispersed in a dissimilar manner.

11. The inkjet ink of claim 9, wherein each of the pigments in the first pigment dispersion and in the second pigment dispersion is selected from the group consisting of carbon black, an organic pigment, a white inorganic pigment, a colored inorganic pigment, and mixtures thereof.

12. The inkjet ink of claim 9, wherein the first domain is a cellulose domain and the second domain is a calcium carbonate domain.

13. The inkjet ink of claim 9, wherein the pigments in the first pigment dispersion and in the second pigment dispersion comprise polymer-attached pigments.

14. The inkjet ink of claim 9, wherein the pigment in the first pigment dispersion is modified with saccharides, amides, and polymers thereof.

15. An inkjet ink having improved print quality on a plain paper with multiple domains, comprising:
   a first pigment dispersion and a second pigment dispersion, wherein the first pigment dispersion is formulated to interact with a first domain of the plain paper and the second pigment dispersion is formulated to interact with a second domain of the plain paper, wherein the first pigment dispersion comprises anionically modified polyethyleneimine or pentaethylenehexamine; and
   an ink vehicle.

16. The inkjet ink of claim 9, wherein the second pigment dispersion comprises a polyacrylate attached to the pigment.

17. The inkjet ink of claim 9, wherein the first pigment dispersion and the second pigment dispersion are present at a ratio ranging from approximately 1:4 to approximately 4:1.

* * * * *